Jan. 20, 1959 J. P. FRANCIS 2,869,562
AUTOMOBILE WINDSHIELD WEATHER PROTECTOR
Filed March 5, 1957
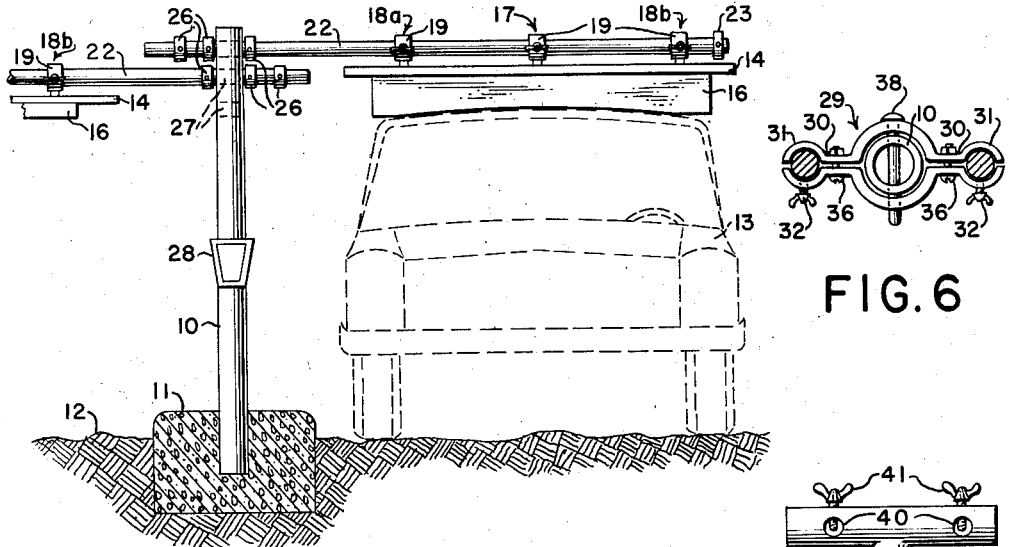
FIG. 1
FIG. 6
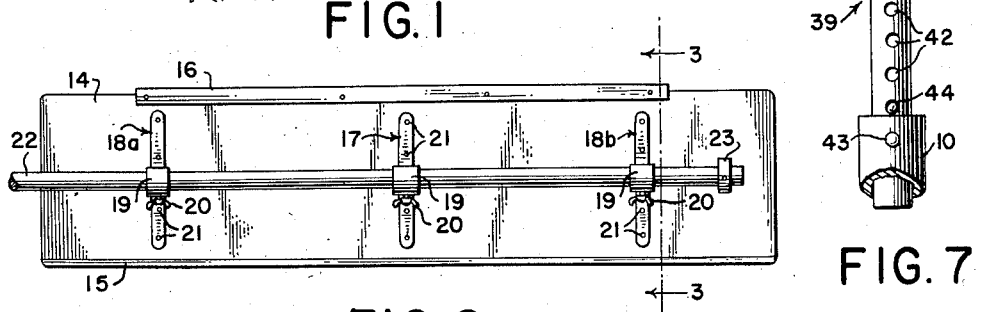
FIG. 2
FIG. 7
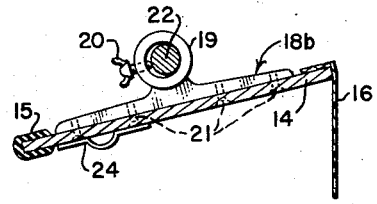
FIG. 3
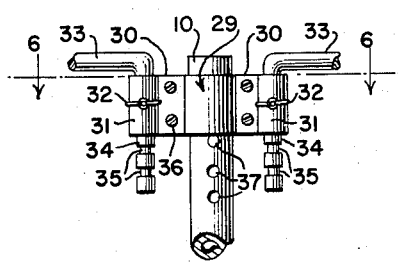
FIG. 5
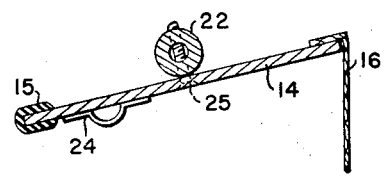
FIG. 4
INVENTOR
John P. Francis

United States Patent Office 2,869,562
Patented Jan. 20, 1959

2,869,562

AUTOMOBILE WINDSHIELD WEATHER PROTECTOR

John P. Francis, Haverhill, Mass.

Application March 5, 1957, Serial No. 644,050

1 Claim. (Cl. 135—5)

This invention relates generally to automobile windshield weather protectors and more particularly to an awning which is supported above and over the roof and the windshield area of an automobile from a horizontally supported arm extending from a vertically mounted ground support, and adapted for use in a drive-in parking area such as a drive-in theatre, an object thereof being to provide an extremely simple, sturdy and inexpensive weather protector for the protection of the windshield area of an automobile in maintaining clear vision at all times during inclement weather.

Another object of this invention is to provide an awning which is supported for angular adjustment in relation to the windshield and adapted to be adjustably movable laterally or vertically, or both, in relation to the roof of the vehicle, thereby providing weather protection to roofless and extremely lowly built automobiles, as well as the more conventional type automobiles.

A further object of this invention is to provide an adjustable awning having a rear flexible rain sealing curtain depending therefrom adapted to engage the lateral contour of the roof top of the automobile to protect the extreme forward portion of the roof and the windshield area from having any rain descending from the roof top, due to the structural slope thereof or the directional course of the rain, and to also provide rear weather protection for the occupants in an open or roofless automobile.

A still further object of this invention is to provide an automobile windshield weather protector which may be easily assembled or dis-assembled either in part or in whole, and adapted to receive structural part replacements or any of the modifications pertaining to the device, and adapted further to be supported at a minimum height to provide unobstructed vision for other automobile occupants when the device is in use.

With these objects and still others in view, as will hereinafter more fully appear, the invention comprises certain novel constructions, combinations and arrangement of parts, hereinafter described and claimed, and illustrated in the accompanying drawings, in which:

Figure 1 is a side elevation view of the automobile windshield weather protector showing the awning supported over the roof of an automobile with the rain curtain in sealing engagement therewith, and including a partial view of a similar and opposite weather protector supported at a lower level.

Figure 2 is a top plan view of the weather protector showing the awning supported by a series of longitudinal supporting brackets engaging the lateral supporting arm.

Figure 3 is a cross-sectional view taken on line 3—3 of Figure 2.

Figure 4 is also a cross-sectional view, of a modified form of support, showing the awning being supported to the lateral supporting arm for angular movement.

Figure 5 is a side elevation view, of a modified means of support, showing the sectional supporting bands attached to the vertical post for supporting the supporting arms therefrom.

Figure 6 is a top plan view taken on line 6—6 of Figure 5; and

Figure 7 is a side elevation view, of a modified means of support, showing a T-shaped support for supporting opposing supporting arms at the same level and adapted for vertical adjustment within the vertical post.

Referring in detail to the drawings, a vertical supporting post 10 is shown encased in concrete 11 extending slightly above the ground level 12 to provide anchoring and safety means for the overhead structure supported from the supporting post 10.

In Figure 1 is shown the front end of an automobile 13 with the windshield area and a portion of the roof under the protective cover of the awning 14, the awning 14 being formed of a substantially rectangular semi-rigid or rigid panel member of sheet metal, Masonite, fibre board, or other suitable composition. Although I have shown a panel member forming the awning 14 it is to be understood that a rectangular open frame work covered with a flexible water repellent covering may be used for the awning.

As shown in Figures 2, 3 and 4, the awning 14 is provided with a U-shaped flexible rubber bead to protect the said awning or the roof top of the vehicle from any accidental damage and to also serve as a rain drip molding 15 so that any rain accumulation may run off at one end or the other to prevent the rain from descending on the hood and splattering back onto the lower portion of the windshield area. A flexible water repellent drop curtain 16 is secured to the rear lateral portion of the awning 14 with the lower portion thereof engaging the lateral contour of the roof top of an automobile to provide rain sealing engagement therewith in preventing rain, sleet or snow from descending from the said roof top down upon the windshield area of said vehicle.

Longitudinal supporting brackets, Figures 1, 2 and 3, generally designated by the numerals 17, 18a and 18b, are each provided with a lower longitudinal supporting member each depending from the sleeve member 19, each sleeve member having a thumb screw 20 to adjustably secure each longitudinal supporting bracket to the horizontal supporting arm 22. It is to be understood that a single longitudinal supporting bracket 17, or two 18a and 18b, or more of said brackets may be used to support the awning 14 from the arm 22. In Figure 4, a modified means of support, there is shown an awning 14 attached to the supporting arm 22 by screws 25 engaging said arm 22 and adapted to be angularly adjusted upon partial rotation of said arm 22. A flexible handle 24 made of material such as canvas, rubber, or the like, is secured to the underside of the awning 14, Figures 3 and 4, to enable the occupant within the automobile to adjust the angular position of the said awning upon sufficient force thereto, for the desired angular position due to the location of the parked vehicle or the direction and the force of the rain.

In Figure 2 the awning 14 is shown secured to the longitudinal supporting brackets 17, 18a and 18b, by screws 21, the said brackets being mounted onto the horizontal supporting arm 22. Attached to said arm 22 is a stop member 23 to limit the lateral movement of the awning 14. The horizontal supporting arm 22 extends laterally from the vertical supporting post 10, as shown in Figure 1, or it may be supported from the T-shaped support generally designated by the numeral 39 in Figure 7, which is adjustably mounted onto the existing supporting post 10 for support thereto. The modified form of a supporting arm 33, Figures 5 and 6, extends from the modified form of a clamp support generally designated by the numeral 29, which also is adjustably mounted onto an existing supporting post 10 for support thereto.

Referring back to Figure 1, on the supporting post 10 there is shown the speaker basket 28, both of which are more or less standard equipment, with the said post having a number of horizontal apertures 27 formed through the post for the support and the vertical height adjustment of the horizontal supporting arms 22 shown extending from the uppermost apertures 27. The supporting arms 22 are additionally provided with adjustable stop members 26 to limit the lateral movement of said arms 22 or the axial rotation thereof. The opposite partially shown weather protector extends at a lower level from post 10 and may be provided with a rain curtain 16 of shorter height in order to align with the opposing rain curtain 16. This is eliminated when the modified means of support in the form of a T-shaped support 39 is used.

The T-shaped support 39, Figure 7, is provided with two apertures 40 in the upper portion thereof to support laterally adjustable opposing supporting arms 22 adjustably secured in position by thumb screws 41. On the vertical leg portion of support 39 is a series of pin apertures 42 for the vertical adjustment of said support, whereby a supporting pin 44 engages one of the apertures 42 and also the top of the vertical supporting post 10. A securing pin aperture 43 formed in post 10 is adapted to engage a securing pin through the said post aperture and also one of the series of pin apertures 42 of the vertical leg to secure the support 39 from any axial rotation. Removal of the securing pin from the securing pin aperture 43 of post 10 permits axial rotation of the T-shaped support 39, whereby the awning 14 may be pivotally adjusted from the "in use" position to a longitudinal "in stored" position, which is parallel with and spaced apart from the parked automobile.

In Figure 5, which is the modified means of support, there is shown a split type clamp support 29 comprising a pair of mated sections, each section having a central body portion conforming somewhat to the contour and diameter of the post 10 and including flat surface portions 30 provided with bolts 36 to clampingly and adjustably engage the mated sections of the said support 29 onto post 10. The semi-circular end portions 31, when mated, are adapted to engage the angled arm portion 34 of the modified form of a supporting arm 33. The angled arm portion 34 may be provided with circular grooves 35 adapted to engage the stud portion of thumb screw 32 for any vertical or lateral adjustment of arm 33.

Vertical and lateral adjustment of the arm 33 and clamp support 29 may also be controlled by the supporting pin 38, shown in Figure 6 and taken on line 6—6 of Figure 5. The pin 38 engages one of the series of apertures 37 formed in post 10, Figure 5, whereby the clamp support 29 is supported upon the said pin 38 in either an adjustable or securely fastened position.

Referring back to the preferred embodiment, Figure 7, the modification of the T-shaped support 39 has many distinct advantages such as, providing a supporting member capable of supporting an automobile awning for lateral, vertical, axial or angular adjustment over the roof and the windshield area of said vehicle; and for adjustably providing a rain sealing weather protector for verious types of automobiles whether high or low in height, or of the open type or the closed type of a vehicle.

The simplicity of the structure of my device; the ease of assembly and the dis-assembly thereof; the simplicity of its operation; the exceedingly minor, when required, manual labor for the occupant within the automobile to manipulate the awning for angular adjustment; the assured clear windshield vision without the use of any windshield wipers; and, the satisfaction and enjoyment to the occupants within the said vehicle regardless of the inclement weather, all of which may be readily understood from the aforementioned description of the device and the accompanying drawings.

Having thus described my invention, I desire to add that changes may be made in one embodiment alone or combined in one embodiment with the other. I desire to add further that the supporting arm may be constructed of any suitable form of material such as tubular pipe or rod.

I claim:

An automobile windshield weather protector adapted for erection and use in a drive-in parking area such as a drive-in theatre comprising, a supporting post, a horizontally mounted supporting arm adjustable vertically and also axially relative to the longitudinal axis of said supporting arm, said supporting arm extending laterally across and just above the roof top of an automobile from the said supporting post, cross bores on said supporting post for adjustably supporting the said horizontal supporting arm for said vertical and longitudinally axial adjustment therefrom, an awning supported from the said horizontal supporting arm in proximity to the roof top and the upper windshield area of said automobile and adjustably movable thereto in spaced apart or free frictional engagement with the said roof top upon said vertical and longitudinally axial adjustment of said horizontal supporting arm in the alignment of said awning, and a separable freely suspended lateral rain sealing member adjustably supported from the said vertically and angularly adjustable awning and adapted to freely and frictionally engage the forward lateral portion of the roof top in providing a rain sealing engagement between the said adjustable spaced apart awning and the said lateral portion of the roof top of said automobile upon the movable alignment of said awning.

References Cited in the file of this patent

UNITED STATES PATENTS

| | | |
|---|---|---|
| 494,556 | Doyle | Apr. 4, 1893 |
| 739,446 | Reger | Sept. 22, 1903 |
| 2,362,360 | Davis | Nov. 7, 1944 |
| 2,508,757 | Gray | May 23, 1950 |
| 2,549,662 | Carpenter | Apr. 17, 1951 |
| 2,694,231 | Bermejo | Nov. 16, 1954 |